United States Patent [19]

Fernz

[11] Patent Number: 4,909,442
[45] Date of Patent: Mar. 20, 1990

[54] ACTUATION SYSTEM FOR A BLOCKER DOOR IN A JET ENGINE NACELLE

[75] Inventor: James A. Fernz, Wichita, Kans.

[73] Assignee: The Boeing Company, Seattle, Wash.

[21] Appl. No.: 262,192

[22] Filed: Oct. 19, 1988

Related U.S. Application Data

[63] Continuation of Ser. No. 609,699, May 14, 1984, abandoned.

[51] Int. Cl.$^4$ ............................................. F02K 1/60
[52] U.S. Cl. ............................... 239/265.29; 60/226.2; 60/230; 239/265.31; 244/110 B
[58] Field of Search ................... 244/110 B; 60/226.2, 60/230; 239/265.25, 265.31; 91/44

[56] References Cited

U.S. PATENT DOCUMENTS

| | | | |
|---|---|---|---|
| 2,955,418 | 10/1960 | David et al. | 239/265.31 |
| 3,084,507 | 4/1963 | Kleinhans et al. | 239/265.31 |
| 3,981,451 | 9/1976 | Prior et al. | 244/110 B |
| 4,391,409 | 7/1983 | Scholz | 60/226.2 |
| 4,407,120 | 10/1983 | Timms | 239/265.31 |
| 4,505,108 | 3/1985 | Woodruff et al. | 91/44 |

Primary Examiner—Galen Barefoot
Attorney, Agent, or Firm—Finnegan, Henderson, Farabow, Garrett & Dunner

[57] ABSTRACT

An actuation system for pivoting a blocker door and blocking and redirecting airflow through cascades during thrust reversal of an aircraft. The system is operated when an engine nacelle thrust reverser sleeve assembly is opened and then closed.

1 Claim, 2 Drawing Sheets

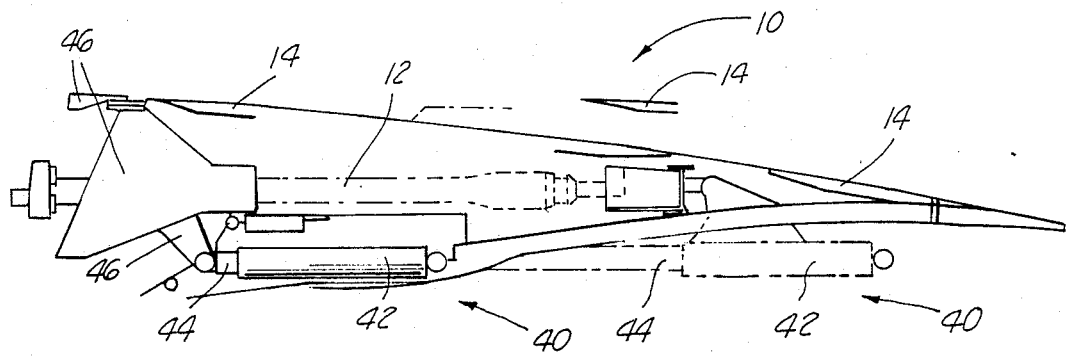
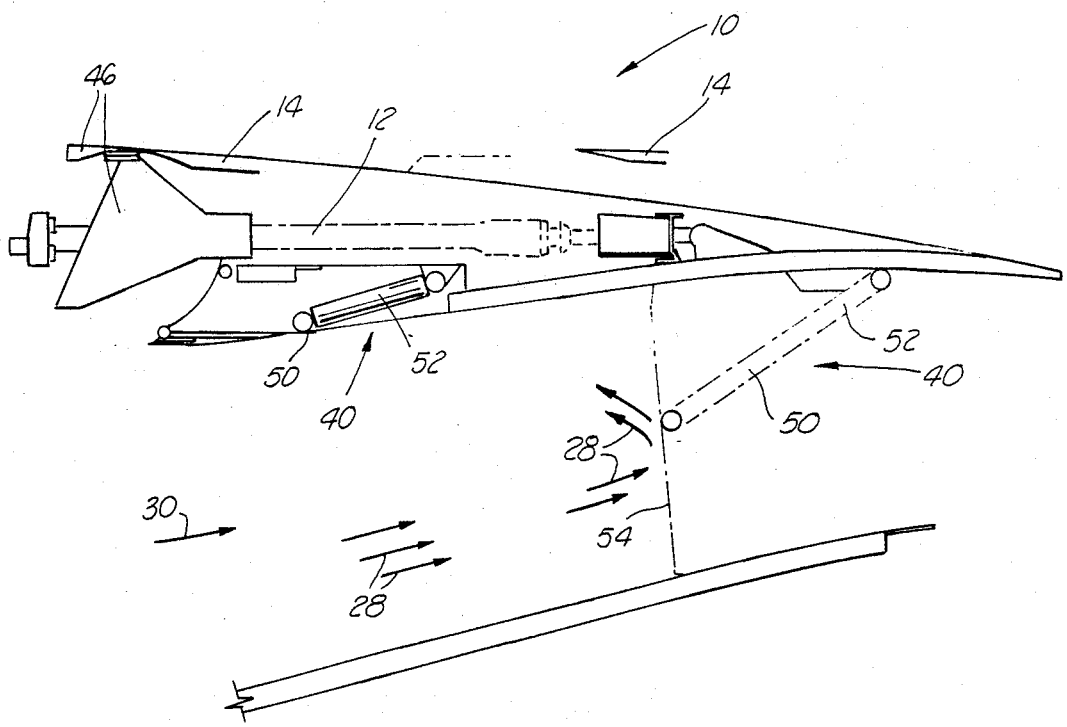

ACTUATION SYSTEM FOR A BLOCKER DOOR IN A JET ENGINE NACELLE

This application is a continuation of application Ser. No. 06/609,699, filed May 14, 1984, now abandoned.

BACKGROUND OF THE INVENTION

This invention relates to an actuation system for a blocker door used to redirect airflow and more particularly but not by way of limitation to a system for opening and closing a blocker door in a jet engine nacelle.

Heretofore, when a power actuator translated a thrust reverser sleeve assembly on an engine nacelle, a drag link was connected to each blocker door by a spring loaded fitting on the sleeve assembly. The other end of the drag link was connected to a fitting on the inner fan duct wall of the nacelle. As the sleeve assembly is translated, one end of the drag link is rotated on the inner wall fitting. The other end of the drag link is rotated on the blocker door fitting which forces the blocker door to rotate about its hinge and block the airflow in the fan duct. As the sleeve assembly is translated rearwardly, the cascades are exposed. The blockage of airflow by the blocker door causes the fan air to exit through the cascades resulting in a desired thrust reversal.

The primary problem in this type of operation was the drag links pass through the fan air duct disrupting the airflow which resulted in a performance penalty. Also, the drag link and its attachments have had service problems due to the unpredictable effect of the airflow upon the drag link. Further, with drag link and fittings exposed upstream in the fan duct, there are aerodynamic drag loss.

The subject invention eliminates the above mentioned problems in the opening and closing of blocker doors. In the following U.S. patents: U.S. Pat. No. 3,262,268 to Beavers, U.S. Pat. No. 3,603,211 to Medawar et al, U.S. Pat. No. 3,612,209 to Vdoviak, U.S. Pat. No. 4,020,291 to Sarigisson U.S. Pat. No. 4,147,029 to Sargisson and U.S. Pat. No. 4,346,973 to Lawson various types of thrust reverser sleeve assemblies are disclosed having fluid pressure cylinders and pistons for opening and closing blocker doors. None of these prior art patents specifically disclose the unique features and advantages of the subject actuation system as described herein.

SUMMARY OF THE INVENTION

The subject actuation system for a blocker door in a jet engine nacelle eliminates the use of drag links which heretofore resulted in aerodynamic drag loss and performance penalties.

Further the invention eliminates the use of the drag links and pivot attachments which have been service problems because of its unpredictable effect in the engagement of fan air in the fan duct.

The actuation system provides a sleeve assembly fluid cylinder and piston connected to one or more blocker door cylinder and pistons. It is a closed loop system and automatically operates when a power actuator translates the thrust reverser sleeve assembly into an opened and closed position.

Further the actuation system provides force to separate the thrust reverser sleeve assembly from the fixed structure of the engine nacelle eliminating the need of preloaded bumper assemblies. Further, the system provides positive fluid pressure to maintain the blocker doors in a closed preloaded position thereby eliminating blocker door spring fitting assemblies.

The actuation system for a blocker door in a jet engine nacelle includes a sleeve assembly fluid cylinder and piston. The cylinder is connected to the thrust reverser sleeve assembly. The piston is connected to the fixed structure of the nacell and is extended as the power actuator translates the thrust reverser sleeve assembly into an open position. One or more blocker door cylinders are connected to the sleeve assembly with blocker door pistons connected to the downstream airflow side of the blocker doors. As the thrust reverser sleeve assembly is opened, the blocker door pistons are extended pivoting the blocker doors on there hinges into an open position blocking airflow in the fan duct and causing the airflow to exit through the nacelle cascades resulting in thrust reversal.

The advantages and objects of the invention will become evident from the following detailed description of the drawings when read in connection with the accompanying drawings which illustrate preferred embodiments of the invention.

BRIEF DESCRIPTION OF THE DRAWINGS

FIGS. 3 and 4 illustrate the actuation system mounted on a portion of the thrust reverser sleeve assembly and fixed structure of the engine nacelle.

DETAILED DESCRIPTION OF THE DRAWINGS

Figure 1:
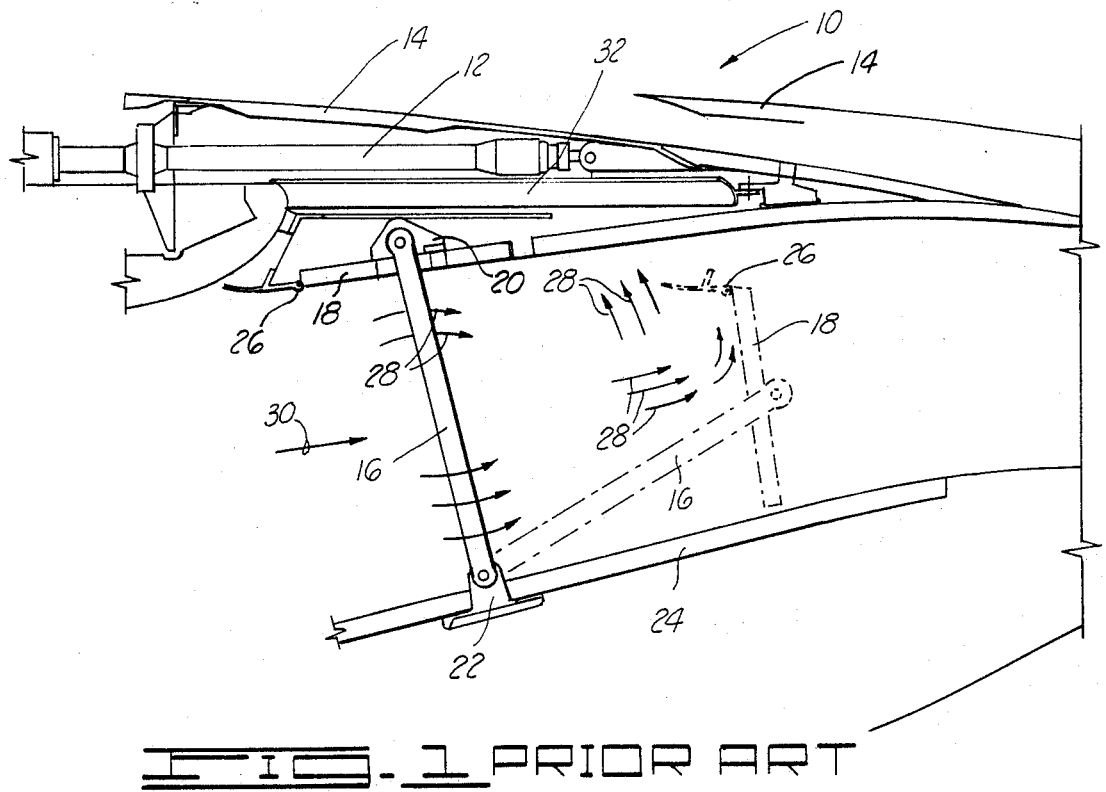
FIG. 1 illustrates a prior art thrust reverser sleeve assembly with a drag link and fitting connected to a blocker door.

In FIG. 1 a portion of a jet engine nacelle is shown and designated by general reference numeral 10. The nacelle 10 includes a power actuator 12 which is used to translate a thrust reverser sleeve assembly 14 from a closed position to an opened position to the right in the drawings. Heretofore a drag link 16 was connected to a blocker door 18 by a spring loaded fitting 20 on a portion of the sleeve assembly 14.

As the sleeve assembly 14 is translated to the right in an opened position, the drag link 16 rotates on an inner wall fitting 22 attached to an inner fan duct wall 24. The drag link 16 rotates on the blocker door fitting 20 forcing the blocker door 18 to rotate about a hinge 26 and block airflow indicated by arrows 28 in the fan duct indicated by numeral 30. The drag link 16 and blocker door 18 are shown in dotted lines in an open position.

As the sleeve assembly 14 is translated into an opened position, cascades 32 are exposed. The blockage of the airflow indicated by arrows 28 causes the fan air to exit through the cascades 32 resulting in a thrust reversal mode of the aircraft.

The primary problem in this type of structure as shown in FIG. 1 was the drag link 16 passed upstream through the fan air duct 30 disrupting the fan air 28 which resulted in an aerodynamic drag and a performance penalty. Also the drag link 16 and its fittings have become a service problem due to the unpredictable effect of the fan air upon the drag link 16.

Figure 2:
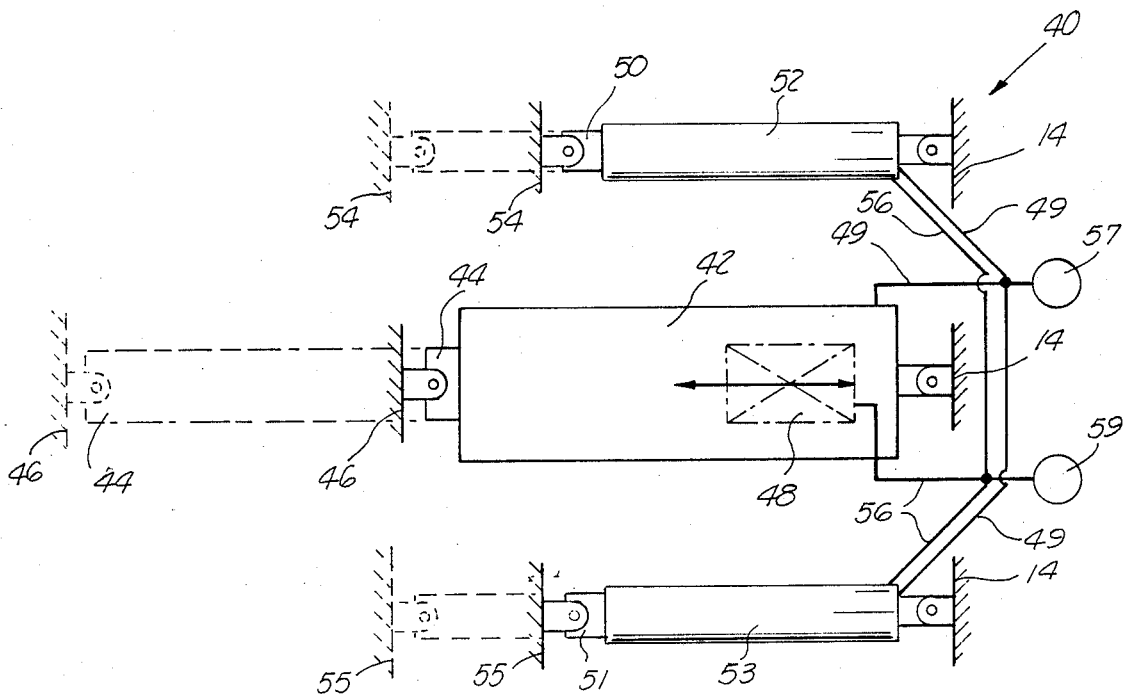
FIG. 2 illustrates a schematic of the actuation system.

In FIG. 2 the subject actuator system for a blocker door in a jet engine nacelle is shown as general reference numeral 40 and utilizing a sleeve assembly fluid cylinder 42 with piston 44. The cylinder 42 is connected to a portion of the sleeve assembly 14 with the piston 44 connected to a fixed structure 46 which is part of the nacelle 10.

In a closed position, the cylinder 42 and piston 44 contain an internal spring 48 mounted therein. The spring 48 provides a force to separate the sleeve assembly 14 from the fixed structure 46 thereby eliminating preloaded bumper assemblies which were heretofore required in this type of application. Also, the internal spring 48 held in tension provides a positive pressure on the piston 44 in the cylinder 42. This pressure preloads the piston 44 in a closed position holding a blocker door 54 in a closed position and also provides a positive pressure on a blocker door piston 50 in a blocker door cylinder 52. The cylinder 52 is also attached to the sleeve assembly 14 with the blocker door piston 50 attached to the blocker door 54. By applying the preloaded fluid pressure on the blocker door 54, a blocker door spring fitting assembly is eliminated.

It should be noted, in FIG. 2. the sleeve assembly fluid cylinder 42 is communicably connected to the blocker door cylinder 52 via a fluid discharge line 49 and a return line 56. These lines are also connected to a second blocker door piston cylinder 53 and piston 51. In this example, the sleeve assembly fluid cylinder 42 and piston 44 are in a closed loop system with two blocker door cylinders and pistons. In a typical jet engine nacelle application, there are six blocker doors on one side of the nacelle with six doors on the opposite side of the nacelle. In this type of application there could be three sleeve assembly fluid cylinders and pistons mounted on opposite sides of the nacelle for driving each of the six blocker doors. The system status indicators 57 and 59 are connected to the discharge line 49 and return line 56 to indicate the fluid charge level for easy pre-flight inspection of the systems operational status.

Referring now to FIG. 3, the sleeve assembly fluid cylinder 42 and piston 44 are shown in a closed position to the left. Also the sleeve assembly 14 is shown in a translated position to the right with the piston 44 in an extended position.

Referring now to FIG. 4, when the actuator 12 translates the sleeve assembly 14 to the right, the piston 44 in the cylinder 42 is extended. The extension displaces fluid in the cylinder 42 and relieves the preloaded spring 48. At this time, fluid is displaced through the discharge line 49 to the cylinders 52 and 53. At this time, fluid pressure is applied to the blocker door pistons 50 and 51 causing the blocker doors 54 and 55 to rotate about their hinge and block the airflow 28 in the fan duct 30. Since both of the blocker door pistons 50 and 51 are mounted downstream in the air fan duct 30 with the end of the pistons 50 and 51 attached to the downstream side of the blocker doors 54 and 55, there is no longer structure in the fan duct 30 upstream from the blocker doors to cause aerodynamic drag and a loss of performance.

When the thrust reverser sleeve 14 is closed by moving the sleeve to the left, the forces on the blocker doors 54 and 55 are reacted in the pistons 50 and 51 creating an increase in fluid pressure which is reacted as a closing force in the piston 44. When the sleeve assembly 14 is closed, the sleeve assembly piston 44 allows fluid in the cylinders 52 and 53 to be reversed in direction through return line 56. Also, as the blocker doors 54 and 55 move to a closed position, the reverse of the direction of airflow in the fan air duct 30 forces the blocker doors to return to its original closed position. Also, during this time, the internal spring 48 in the cylinder 42 creates a pressure in the discharge line 49 driving the blocker door cylinders 52 and 54 into a closed preloaded condition.

Changes may be made in the construction and arrangement of the parts or elements of the embodiments as described herein without departing from the spirit or scope of the invention defined in the following claims.

What is claimed is:

1. In a jet engine having a nacelle defining an axial gas flow path and a thrust reverser apparatus having means for selectively axially moving a movable portion of the nacelle relative to a fixed portion of the nacelle to selectively open and close a transverse gap for gas passage and having a blocker door disposed for transverse placement in the flow path in response to opening of the transverse placement in the flow path in response to opening of the transverse gap, the improvement comprising:

a sleeve cylinder-piston assembly including a first cylinder having first and second ends and a first piston having first and second ends, said first end of said first cylinder being fixed to the movable portion and said second end of said first cylinder telescopically receiving said first end of said first piston, an outlet port for discharging fluid from said first cylinder on movement of said first piston out of said first cylinder, and an inlet port for receiving fluid on movement of said first piston into said first cylinder in the retracted position, said second end of said first piston being fixed to the fixed portion;

spring means disposed in said sleeve cylinder-piston assembly for holding said first piston in said retracted position in said first cylinder and for providing a cushioning force between the fixed and movable portions of the nacelle;

a blocker door cylinder-piston assembly including a blocker door, a second cylinder having first and second ends and a second piston having first and second ends, said first end of said second cylinder being fixed to the movable portion and said second end of said cylinder telescopically receiving said first end of said second piston, an inlet port for receiving fluid to move said second piston out of said second cylinder, and an outlet port for discharging fluid to move said second piston into said second cylinder, said second end of said second piston being connected to said blocker door such that movement of said second piston out of said second cylinder disposes said blocker door in the flow path; and a closed-loop fluid conduit system interconnecting the inlet and outlet ports of said sleeve cylinder-piston assembly and said blocker door cylinder-piston assembly such that movement of the movable portion to open the transverse gap discharges fluid from said sleeve cylinder-piston assembly to said blocker door cylinder-piston assembly to dispose said blocker door in the flow path and to effect the reverse on closure of the transverse gap.

* * * * *

UNITED STATES PATENT AND TRADEMARK OFFICE
CERTIFICATE OF CORRECTION

PATENT NO. :   4,909,442
DATED      :   March 20, 1990
INVENTOR(S) :  James A. Fernz It is certified that error appears in the above-identified patent and that said Letters Patent is hereby corrected as shown below:

IN THE SPECIFICATION:

Column 1, line 34, change "are" to --is--;
         line 41, change "Sarigisson" to --Sargisson,--.
Column 2, line 15, change "there" to --their--.
Column 3, line 19, "." should be --,--.

Signed and Sealed this

Nineteenth Day of March, 1991

Attest:

HARRY F. MANBECK, JR.

Attesting Officer   Commissioner of Patents and Trademarks